Oct. 10, 1944.          G. A. GOESSLING                2,359,840
                     INJECTION MOLDING MACHINE
                     Original Filed Dec. 21, 1942
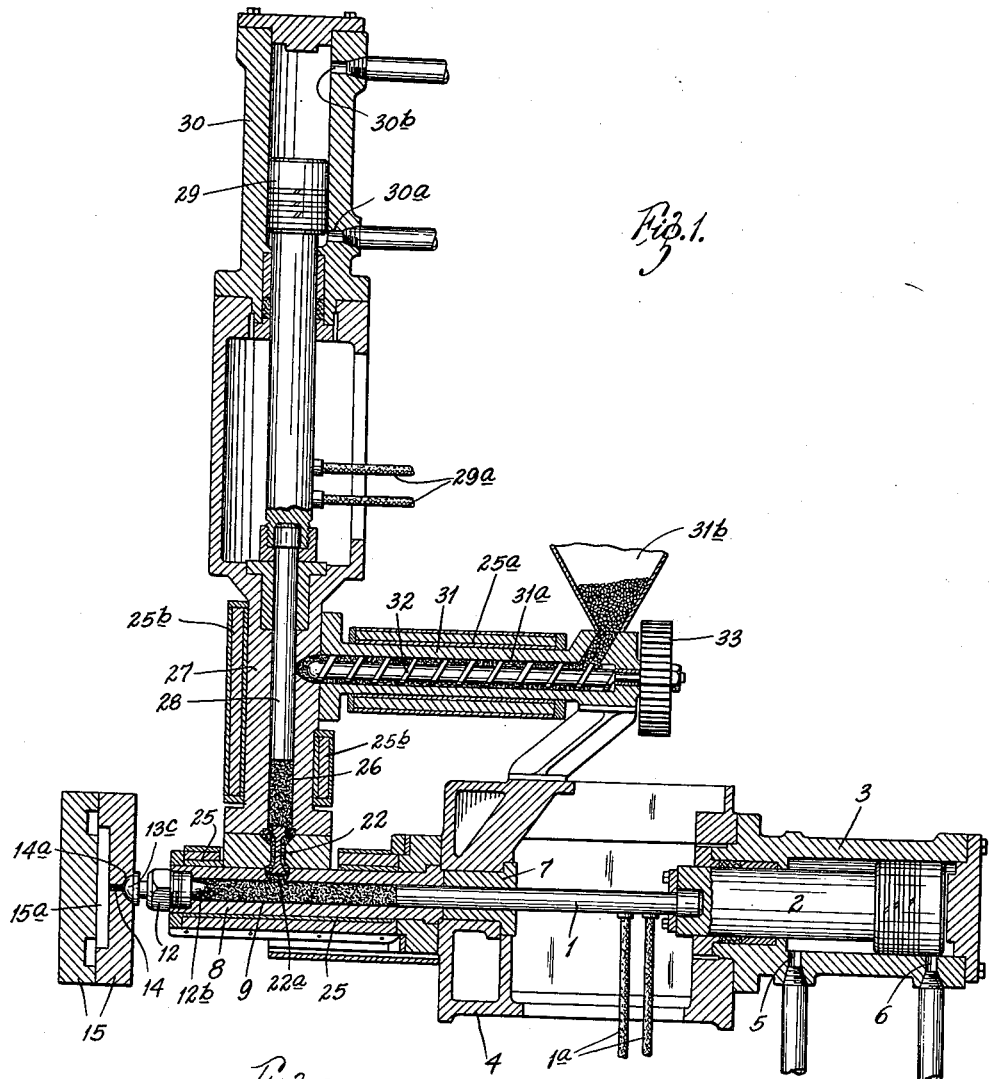

Patented Oct. 10, 1944

2,359,840

UNITED STATES PATENT OFFICE 2,359,840

INJECTION MOLDING MACHINE

Gerald A. Goessling, Richmond Heights, Mo., assignor to Pro-Phy-Lac-Tic Brush Company, Florence, Mass., a corporation of Delaware Original application December 21, 1942, Serial No. 469,623. Divided and this application September 25, 1943, Serial No. 503,744

4 Claims. (Cl. 18—30)

The subject matter hereof is divided out of my copending application Serial No. 469,623 filed December 21, 1942, for patent for Injection molding machine.

This invention relates to machines for injection molding or die casting of plastics, that is, molding machines of the kind wherein the heat-softened plastic material is forced or injected from a pressure cylinder by a ram therein into a mold cavity to form the molded article. The invention has for its principal object to increase the plasticizing speed and capacity of the above type of molding machine without lengthening the stroke of the injection ram, without loss of injection pressure, and without increasing the power required to operate said ram. Other objects are to provide a more uniform flow and thorough breaking up and heating of the molding material. The invention consists in the injection molding machine, in the plasticizing attachment for injection molding machines and in the parts and in the combinations and arrangements of parts hereinafter described and claimed.

In the accompanying drawing, which forms part of this specification and wherein like symbols refer to like parts wherever they occur, Fig. 1 is a central vertical longitudinal section through an injection molding machine embodying my invention; and Fig. 2 is an enlarged fragmentary central longitudinal section through the nozzle end of the injection cylinder.

In the accompanying drawing, my invention is shown embodied in an injection molding machine comprising a horizontally disposed ram or plunger 1 which is secured at its rear end to a fluid actuated piston 2 for reciprocation thereby. The piston 2 works in a cylinder 3 which is fixed to the rear end of a supporting housing 4. The piston 2 is actuated by fluid pressure supplied to the cylinder 3 through a port 5 at one end thereof and a port 6 at the opposite end thereof. The ram 1 extends through the housing 4 beyond the front end thereof and is slidably supported in a non-rotary bushing 7 mounted in said housing near the forward end thereof. The ram 1 is cooled with water circulated therethrough by flexible pipes 1a communicating therewith. Rigidly fixed to the forward end of the housing 4 coaxial with the bushing 7 is an injection cylinder 8 having an axial bore 9 adapted to snugly receive the reciprocatory ram or injection plunger 1.

The bore 9 of the pressure cylinder 8 is of uniform diameter from end to end thereof and opens at its outer end into the forwardly tapered outlet passageway 12a of an injection nozzle 12 that is threaded into the front end of said cylinder. Disposed in the adjacent ends of the cylinder 8 and nozzle 12 is a streamlined spreader or torpedo 12b; and reciprocable in the discharge end of the outlet passageway 12a of said nozzle and an axial bore in said spreader is an inwardly opening discharge valve 13 that is closed by a spring 13a mounted in said last mentioned bore. The discharge valve 13 has a discharge passageway 13b that opens through the outer end thereof and is adapted to communicate with the outlet passageway 12a of the nozzle 12 when said valve is pressed inwardly against the pressure of the valve closing spring 13a. The outer or discharge end of the valve 13 is rounded, as at 13c, to exactly fit the correspondingly shaped mouth 14a of an entrance or gate 14 leading to the mold cavity 15a of a sectional die or mold 15, which is moved by any suitable means (not shown) into engagement with the valve 13 to move the same inwardly in the nozzle 12 and bring the discharge passageway 13b therefor into communication with said entrance or gate.

The injection cylinder 8 is heated substantially throughout the entire length thereof by an electric heating element 25, and the ram receiving bore 9 of said cylinder communicates with the bore 26 of an upright second cylinder 27 through a material inlet opening or passageway 22 that preferably is clear of the working end of the injection cylinder ram 1 in all positions of the reciprocating movement thereof. Communication between the cylinder 27 and the injection cylinder 8 through the passageway 22 is controlled by a valve 22a that is located in said passageway and opens in the direction of said injection cylinder. Working in the bore 26 of the second or feed cylinder 27 is a ram or plunger 28 that is reciprocated by a hydraulically operated piston 29 located in the cylinder 30 supported on the cylinder 27. The piston 29 is actuated by the fluid pressure supplied to the cylinder 30 through a port 30a at one end thereof and a port 30b at the other end thereof; and the ram 28 operated by said piston is cooled with water circulated therethrough by flexible pipes 29a.

Fixed to one side of the second cylinder 27 at right angles thereto is a third or plasticizing cylinder 31, the bore or conduit 31a of which opens at one end into the ram receiving bore 26 of the second cylinder 27 in the retracted position only of the ram 28 therein. Journaled in the bore 31a of the cylinder 31 is a plasticizing feed screw 32 adapted to receive the raw, pulverulent molding compound from a supply hopper 31b which opens into the outer end of said bore. The plasticizing screw 32 is continuously driven by means of a power driven gear 33 fixed to the outer end thereof. The plasticizing cylinder 31 is heated substantially throughout its entire length by an electric band heater 25a; and the feed cylinder 27 is heated by an electric band heater 25b from its port of communication with said feed screw cylinder to a point closely adjacent to the injection cylinder 8.

By the arrangement described, raw pulverulent molding material flows from the feed hopper 31b into the outer end of the heated plasticizing cylinder 31 where it is picked up by the continuously rotating plasticizing feed screw 32 and forced thereby into the upright feed cylinder 27 in the retracted position of the ram 28 therein. During its travel through plasticizing cylinder 31, the material is thoroughly mixed and uniformly heated to form a plastic or fluid mass, which is then forced under considerable pressure into the feed cylinder 27 when the ram 28 therein is retracted. The plastic material is then forced from the heated feed cylinder 27 by the ram 28 therein through the valved passageway 22 into the heated injection cylinder 8 where it is engaged by the ram 1 therein and forced through the valved discharge nozzle 12 into the mold 15.

The hereinbefore described injection molding machine has several important advantages. The molding material is initially plasticized in the heated plasticizing cylinder 31 and such plasticity is maintained or increased during the passage of the material through the heated feed cylinder 27 and the heated injection cylinder 8. The machine greatly increases the quantity of material that can be plasticized in a given length of time without decreasing the injection pressure; and it also enables the full injection pressure to be applied to the material throughout the entire forward stroke of the ram without increasing the power required to operate the latter. The plasticizing feed screw exerts a relatively high continuous pressure on the material; and it also thoroughly mixes the material and thus insures a more uniform heating thereof. Another important advantage of my invention is the adaptability of the plasticizing and feeding device for ready attachment to an ordinary injection molding machine without material change or alteration thereof.

Obviously, the hereinbefore described device admits of considerable modification without departing from the invention. Therefore, I do not wish to be limited to the precise arrangement shown and described.

What I claim is:

1. In a machine for injection molding of plastics having a heated injection cylinder, a normally closed injection valve for said cylinder adapted for cooperation with a mold to be opened thereby, and a ram reciprocable in said cylinder, the combination of a heated second cylinder communicating with the space provided in the injection cylinder in the retracted position of said ram, a valve for controlling such communication and adapted to be closed by the pressure developed by said ram during the injection stroke thereof, a ram reciprocable in said second cylinder, a feed hopper, a heated conduit leading from said feed hopper to the space left in said second cylinder in the retracted position of the ram therein, and a screw rotatable in said conduit for conveying heat-softened material under pressure from said feed hopper to said second cylinder.

2. In a machine for injection molding of plastics having a heated cylinder with a discharge nozzle, and a ram reciprocable in said cylinder for injecting molding material therefrom through said nozzle, the combination of a second cylinder communicating with the first cylinder in advance of the ram therein, a ram reciprocable in said second cylinder for injecting said material therefrom into said first cylinder, a third cylinder communicating with said second cylinder in the retracted position only of the ram therein, a continuously rotating screw working in said third cylinder for feeding said material therefrom under pressure to said second cylinder, and means for heating said second and third cylinders, whereby said material, when supplied to said heated third cylinder in a pulverulent state, is initially plasticized therein and such plasticity is increased successively in said heated second and first cylinders, respectively.

3. In a machine for injection molding of plastics having a heated cylinder with a discharge orifice, a ram reciprocable in said cylinder for injecting molding material therefrom through said orifice, a second cylinder communicating with the first cylinder in all positions of the ram therein, a valve for controlling such communication and adapted to be closed by the pressure developed by the injection stroke of said ram, a ram reciprocable in said second cylinder for injecting said material therefrom through said valve into said first cylinder, a heated third cylinder communicating with said second cylinder in the retracted position only of the ram therein, a continuously rotating screw working in said third cylinder for feeding said material therefrom under pressure to said second cylinder, and means for heating said second cylinder from its point of communication with said heated third cylinder to a point adjacent to said heated first cylinder.

4. In a machine for injection molding of plastics having a heated cylinder with a valved discharge nozzle adapted to be opened by the engagement of a mold therewith, and a cooled ram reciprocable in said cylinder for injecting molding material therefrom through said valved nozzle into said mold, the combination of a second cylinder communicating with the space in said first cylinder in all positions of the ram therein, a valve for controlling such communication and adapted to be closed by the pressure developed by the injection stroke of said ram, a cooled ram reciprocable in said second cylinder for injecting said material therefrom through said valve into said first cylinder, a heated third cylinder communicating with said second cylinder in the retracted position only of the ram therein, a continuously rotating power-driven screw working in said third cylinder for feeding material therefrom under pressure to said second cylinder, and means for heating said second cylinder from its point of communication with said heated third cylinder to a point adjacent to said heated first cylinder.

GERALD A. GOESSLING.